United States Patent
Hsiao et al.

(10) Patent No.: US 10,891,293 B2
(45) Date of Patent: Jan. 12, 2021

(54) PARAMETERIZED CONTINUOUS QUERY TEMPLATES

(71) Applicant: Oracle International Corporation, Redwood Shores, CA (US)

(72) Inventors: Eric Hsiao, San Mateo, CA (US); Xiaochao Zhou, Foster City, CA (US); Jianrong Zhang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/014,748

(22) Filed: Jun. 21, 2018

(65) Prior Publication Data
US 2018/0297402 A1   Oct. 18, 2018

Related U.S. Application Data

(63) Continuation of application No. 13/827,631, filed on Mar. 14, 2013, now Pat. No. 10,042,890.

(Continued)

(51) Int. Cl.
*G06F 16/00* (2019.01)
*G06F 16/2455* (2019.01)
(Continued)

(52) U.S. Cl.
CPC ... *G06F 16/24568* (2019.01); *B29D 30/0681* (2013.01); *B60C 1/0008* (2013.01);
(Continued)

(58) Field of Classification Search
CPC .......... G06F 16/24568; G06F 16/2474; G06F 16/2477; G06F 16/9024; G06F 16/24535;
(Continued)

(56) References Cited

U.S. PATENT DOCUMENTS 5,470,313 A   11/1995   Crocker et al.
7,062,749 B2   6/2006   Cyr et al.
(Continued)

FOREIGN PATENT DOCUMENTS

EP   2474922   7/2012
JP   4219859   8/1992
(Continued)

OTHER PUBLICATIONS

Japanese Application No. JP2015-534676, Office Action dated Oct. 9, 2018, 3 pages.
(Continued)

*Primary Examiner* — Usmaan Saeed
*Assistant Examiner* — Paul Kim
(74) *Attorney, Agent, or Firm* — Kilpatrick Townsend & Stockton

(57) ABSTRACT

Techniques for managing parameterized continuous query templates are provided. In some examples, a continuous query may be generated based at least in part on one or more selections of one or more business logic templates and business event parameters associated with a user. The continuous query may also be configured to retrieve business event data of the user. In some examples, a service provider may receive selection of one or more business logic templates. The service provider may also receive the business event parameters associated with the user. The business event parameters may be received via the selected template. The continuous query may then be generated using the information received via the template.

19 Claims, 9 Drawing Sheets

Related U.S. Application Data

(60) Provisional application No. 61/707,641, filed on Sep. 28, 2012.

(51) Int. Cl.

| | | |
|---|---|---|
| *G06F 16/25* | (2019.01) | |
| *G06F 16/242* | (2019.01) | |
| *G06F 16/245* | (2019.01) | |
| *G06F 16/248* | (2019.01) | |
| *G06F 16/31* | (2019.01) | |
| *G06F 16/951* | (2019.01) | |
| *G06F 16/2453* | (2019.01) | |
| *G06F 16/2458* | (2019.01) | |
| *G06F 16/901* | (2019.01) | |
| *B29D 30/06* | (2006.01) | |
| *B60C 1/00* | (2006.01) | |
| *B32B 27/08* | (2006.01) | |
| *B32B 27/34* | (2006.01) | |
| *B60C 5/14* | (2006.01) | |

(52) U.S. Cl.
  CPC .......... *G06F 16/242* (2019.01); *G06F 16/245* (2019.01); *G06F 16/248* (2019.01); *G06F 16/2453* (2019.01); *G06F 16/2455* (2019.01); *G06F 16/2456* (2019.01); *G06F 16/2474* (2019.01); *G06F 16/2477* (2019.01); *G06F 16/24535* (2019.01); *G06F 16/24539* (2019.01); *G06F 16/24553* (2019.01); *G06F 16/25* (2019.01); *G06F 16/313* (2019.01); *G06F 16/9024* (2019.01); *G06F 16/951* (2019.01); *B29D 2030/0682* (2013.01); *B32B 27/08* (2013.01); *B32B 27/34* (2013.01); *B60C 5/14* (2013.01)

(58) Field of Classification Search
  CPC ......... G06F 16/24539; G06F 16/24553; G06F 16/25; G06F 16/242; G06F 16/245; G06F 16/248; G06F 16/313; G06F 16/951; G06F 16/2453; G06F 16/2455; G06F 16/2456; B29D 30/0681; B29D 2030/0682; B60C 1/0008; B60C 5/14; B32B 27/08; B32B 27/34
  See application file for complete search history.

(56) References Cited

U.S. PATENT DOCUMENTS

| | | | |
|---|---|---|---|
| 7,603,674 B2 | 10/2009 | Cyr et al. | |
| 7,672,964 B1 | 3/2010 | Yan et al. | |
| 7,818,313 B1 | 10/2010 | Tsimelzon et al. | |
| 7,870,167 B2 | 1/2011 | Lu et al. | |
| 8,046,747 B2 | 10/2011 | Cyr et al. | |
| 8,260,768 B2 | 9/2012 | Wang et al. | |
| 8,316,012 B2 | 11/2012 | Abouzied et al. | |
| 8,346,511 B2 | 1/2013 | Schoning et al. | |
| 8,396,886 B1 | 3/2013 | Tsimelzon et al. | |
| 8,447,739 B2* | 5/2013 | Naibo ............... | G06Q 10/06 707/688 |
| 8,484,243 B2 | 7/2013 | Krishnamurthy et al. | |
| 8,745,070 B2 | 6/2014 | Krishnamurthy et al. | |
| 8,762,369 B2 | 6/2014 | Macho et al. | |
| 8,990,416 B2 | 3/2015 | Shukla et al. | |
| 9,256,646 B2 | 2/2016 | Deshmukh et al. | |
| 9,286,352 B2 | 3/2016 | Park et al. | |
| 9,292,574 B2 | 3/2016 | Hsiao et al. | |
| 9,553,918 B1 | 1/2017 | Manion et al. | |
| 9,703,836 B2 | 7/2017 | Hsiao et al. | |
| 9,715,529 B2 | 7/2017 | Park et al. | |
| 9,756,104 B2 | 9/2017 | Shukla et al. | |
| 9,852,186 B2 | 12/2017 | Herwadkar et al. | |
| 9,946,756 B2 | 4/2018 | Hsiao et al. | |
| 9,990,401 B2 | 6/2018 | Toillion et al. | |
| 9,990,402 B2 | 6/2018 | Srinivasan et al. | |
| 10,025,825 B2 | 7/2018 | Deshmukh et al. | |
| 10,042,890 B2 | 8/2018 | Hsiao et al. | |
| 10,083,210 B2 | 9/2018 | Alves et al. | |
| 2002/0038217 A1 | 3/2002 | Young | |
| 2002/0038306 A1 | 3/2002 | Griffin et al. | |
| 2002/0116362 A1 | 8/2002 | Li et al. | |
| 2004/0201612 A1 | 10/2004 | Hild et al. | |
| 2004/0243590 A1 | 12/2004 | Gu et al. | |
| 2005/0120016 A1* | 6/2005 | Midgley ............... | G06F 16/951 |
| 2006/0064487 A1 | 3/2006 | Ross | |
| 2006/0089939 A1 | 4/2006 | Broda et al. | |
| 2006/0100957 A1 | 5/2006 | Buttler et al. | |
| 2006/0167704 A1* | 7/2006 | Nicholls ........... | G06Q 10/06393 705/7.39 |
| 2006/0167869 A1 | 7/2006 | Jones | |
| 2006/0230029 A1 | 10/2006 | Yan | |
| 2007/0156787 A1 | 7/2007 | MacGregor | |
| 2007/0294217 A1 | 12/2007 | Chen et al. | |
| 2008/0028095 A1 | 1/2008 | Lang et al. | |
| 2008/0120283 A1 | 5/2008 | Liu et al. | |
| 2008/0162583 A1 | 7/2008 | Brown et al. | |
| 2008/0195577 A1 | 8/2008 | Fan et al. | |
| 2008/0243451 A1 | 10/2008 | Feblowitz et al. | |
| 2008/0250073 A1 | 10/2008 | Nori et al. | |
| 2008/0255847 A1 | 10/2008 | Moriwaki et al. | |
| 2008/0294996 A1* | 11/2008 | Hunt ..................... | G06Q 30/02 715/739 |
| 2008/0301124 A1 | 12/2008 | Alves et al. | |
| 2008/0301125 A1 | 12/2008 | Alves et al. | |
| 2009/0070355 A1 | 3/2009 | Cadarette et al. | |
| 2009/0112809 A1 | 4/2009 | Wolff et al. | |
| 2009/0112853 A1 | 4/2009 | Nishizawa et al. | |
| 2009/0283206 A1 | 11/2009 | Eskaros et al. | |
| 2009/0313198 A1 | 12/2009 | Kudo et al. | |
| 2010/0017379 A1 | 1/2010 | Naibo et al. | |
| 2010/0036831 A1 | 2/2010 | Vemuri et al. | |
| 2010/0106946 A1 | 4/2010 | Imaki et al. | |
| 2010/0125584 A1 | 5/2010 | Navas | |
| 2010/0138405 A1 | 6/2010 | Mihaila et al. | |
| 2010/0223283 A1 | 9/2010 | Lee et al. | |
| 2010/0250572 A1* | 9/2010 | Chen ................. | G06F 16/24568 707/759 |
| 2010/0312801 A1 | 12/2010 | Ostrovsky et al. | |
| 2011/0016123 A1 | 1/2011 | Pandey et al. | |
| 2011/0016160 A1 | 1/2011 | Zhang et al. | |
| 2011/0035253 A1* | 2/2011 | Mason .................. | G06Q 10/06 705/7.13 |
| 2011/0093162 A1 | 4/2011 | Nielsen et al. | |
| 2011/0161352 A1 | 6/2011 | de Castro Alves et al. | |
| 2011/0178775 A1 | 7/2011 | Schoning et al. | |
| 2011/0179066 A1 | 7/2011 | Cardno et al. | |
| 2011/0295841 A1 | 12/2011 | Sityon et al. | |
| 2012/0016866 A1 | 1/2012 | Dunagan et al. | |
| 2012/0116982 A1 | 5/2012 | Yoshida et al. | |
| 2012/0166421 A1 | 6/2012 | Cammert et al. | |
| 2012/0284420 A1 | 11/2012 | Shukla et al. | |
| 2013/0007539 A1 | 1/2013 | Ananthapadmanabh et al. | |
| 2013/0046725 A1 | 2/2013 | Cammert et al. | |
| 2013/0117317 A1 | 5/2013 | Wolf | |
| 2013/0191370 A1 | 7/2013 | Chen et al. | |
| 2013/0191413 A1 | 7/2013 | Chen et al. | |
| 2014/0019194 A1 | 1/2014 | Anne | |
| 2014/0095462 A1 | 4/2014 | Park et al. | |
| 2014/0095473 A1 | 4/2014 | Srinivasan et al. | |
| 2014/0095483 A1 | 4/2014 | Toillion et al. | |
| 2014/0095525 A1 | 4/2014 | Hsiao et al. | |
| 2014/0095529 A1 | 4/2014 | Deshmukh et al. | |
| 2014/0095535 A1 | 4/2014 | Deshmukh et al. | |
| 2014/0095537 A1 | 4/2014 | Park et al. | |
| 2014/0095540 A1 | 4/2014 | Hsiao et al. | |
| 2014/0095541 A1 | 4/2014 | Herwadkar et al. | |
| 2014/0095543 A1 | 4/2014 | Hsiao et al. | |
| 2014/0379712 A1 | 12/2014 | Lafuente Alvarez | |
| 2015/0156241 A1 | 6/2015 | Shukla et al. | |
| 2016/0103882 A1 | 4/2016 | Deshmukh et al. | |
| 2016/0140180 A1 | 5/2016 | Park et al. | |

(56) References Cited

U.S. PATENT DOCUMENTS

| | | |
|---|---|---|
| 2016/0154855 A1 | 6/2016 | Hsiao et al. |
| 2017/0024912 A1 | 1/2017 | de Castro Alves et al. |
| 2018/0186183 A1 | 7/2018 | Hsiao et al. |
| 2018/0246936 A1 | 8/2018 | Srinivasan et al. |

FOREIGN PATENT DOCUMENTS

| | | |
|---|---|---|
| JP | 2002251233 | 9/2002 |
| JP | 2006338432 | 12/2006 |
| JP | 2007328716 | 12/2007 |
| JP | 2008541225 | 11/2008 |
| JP | 2009134689 | 6/2009 |
| JP | 2010108073 | 5/2010 |
| JP | 2011039818 | 2/2011 |
| JP | 2011-221799 A | 11/2011 |
| JP | 2012168725 | 9/2012 |
| WO | 2009119811 | 10/2009 |
| WO | 2012050582 | 4/2012 |
| WO | 2012154408 | 11/2012 |
| WO | 2014052677 | 4/2014 |
| WO | 2014052679 | 4/2014 |

OTHER PUBLICATIONS

Business Process Management (BPM), IBM—Business Process Management Software, BPM Software, Available online at http://www-142.ibm.com/software/products/us/en/category/BPM-SOFTWARE, Accessed on Jan. 28, 2013, 2 pages.
Esper Reference Documentation Version 3.1.0, EsperTech, Available online at http://esper.codehaus.org/esper-3.1.0/doc/reference/en/pdf/esper_reference.pdf, 2009, 293 pages.
SQL Tutorial-In, Tizag.com, Available online at http://web.archive.org/web/20090216215219/http://www.tizag.com/sqiTutorial/sqlin.php, Feb. 16, 2009, 3 pages.
Using Subqueries, Oracle Database SQL language Reference, 11g Release 1 (11.1), Part No. B28286-06, Available Online at https://web.archive.org/web/20111203033655/http:I/docs.oracle.com/cd/828359_01/server.111 /b28286/queries007.htm, Dec. 3, 2011, 2 pages.
What is BPM?, IBM, Available online at: http://www-01.ibm.com/software/info/bpm/whatis-bpm/, Accessed on Jan. 28, 2013, 3 pages.
U.S. Appl. No. 13/102,665, Final Office Action dated Jul. 9, 2013, 17 pages.
U.S. Appl. No. 13/102,665, Non-Final Office Action dated Feb. 1, 2013, 14 pages.
U.S. Appl. No. 13/102,665, Notice of Allowance dated Nov. 24, 2014, 9 pages.
U.S. Appl. No. 13/827,631, Non-Final Office Action dated Nov. 13, 2014, 10 pages.
U.S. Appl. No. 13/827,631, Final Office Action dated Apr. 3, 2015, 11 pages.
U.S. Appl. No. 13/827,631, Final Office Action dated Oct. 20, 2016, 12 pages.
U.S. Appl. No. 13/827,631, Final Office Action dated Aug. 30, 2017, 18 pages.
U.S. Appl. No. 13/827,631, Non-Final Office Action dated Feb. 16, 2017, 16 pages.
U.S. Appl. No. 13/827,631, Non-Final Office Action dated Feb. 11, 2016, 12 pages.
U.S. Appl. No. 13/827,631, Notice of Allowability dated Jul. 12, 2018, 4 pages.
U.S. Appl. No. 13/827,631, Notice of Allowance dated Mar. 13, 2018, 10 pages.
U.S. Appl. No. 13/827,987, Final Office Action dated Jun. 19, 2015, 10 pages.
U.S. Appl. No. 13/827,987, Non-Final Office Action dated Nov. 6, 2014, 9 pages.
U.S. Appl. No. 13/827,987, Notice of Allowability dated Feb. 17, 2016, 3 pages.
U.S. Appl. No. 13/828,640, Final Office Action dated Jun. 17, 2015, 11 pages.
U.S. Appl. No. 13/828,640, Non-Final Office Action dated Dec. 2, 2014, 11 pages.
U.S. Appl. No. 13/828,640, Notice of Allowance dated Jan. 6, 2016, 16 pages.
U.S. Appl. No. 13/829,958, Final Office Action dated Jun. 19, 2015, 17 pages.
U.S. Appl. No. 13/829,958, Final Office Action dated Jun. 30, 2016, 19 pages.
U.S. Appl. No. 13/829,958, Final Office Action dated Jun. 26, 2017, 22 pages.
U.S. Appl. No. 13/829,958, Non-Final Office Action dated Dec. 11, 2014, 15 pages.
U.S. Appl. No. 13/829,958, Non-Final Office Action dated Dec. 27, 2016, 20 pages.
U.S. Appl. No. 13/829,958, Non-Final Office Action dated Feb. 1, 2016, 20 pages.
U.S. Appl. No. 13/829,958, Non-Final Office Action dated Jan. 8, 2018, 22 pages.
U.S. Appl. No. 13/829,958, Notice of Allowance dated Jun. 11, 2018, 13 pages.
U.S. Appl. No. 13/830,129, Non-Final Office Action dated Feb. 27, 2015, 19 pages.
U.S. Appl. No. 13/830,129, Notice of Allowance dated Sep. 22, 2015, 9 pages.
U.S. Appl. No. 13/830,378, Final Office Action dated Nov. 5, 2015, 28 pages.
U.S. Appl. No. 13/830,378, Final Office Action dated May 1, 2018, 30 pages.
U.S. Appl. No. 13/830,378, Non-Final Office Action dated Feb. 25, 2015, 23 pages.
U.S. Appl. No. 13/830,378, Non-Final Office Action dated Jul. 5, 2017, 44 pages.
U.S. Appl. No. 13/830,428, Final Office Action dated Jun. 4, 2015, 21 pages.
U.S. Appl. No. 13/830,428, Final Office Action dated May 26, 2016, 26 pages.
U.S. Appl. No. 13/830,428, Final Office Action dated Oct. 5, 2017, 33 pages.
U.S. Appl. No. 13/830,428, Non-Final Office Action dated Dec. 5, 2014, 23 pages.
U.S. Appl. No. 13/830,428, Non-Final Office Action dated Jan. 5, 2016, 25 pages.
U.S. Appl. No. 13/830,428, Non-Final Office Action dated Mar. 22, 2017, 25 pages.
U.S. Appl. No. 13/830,428, Notice of Allowance dated Apr. 2, 2018, 9 pages.
U.S. Appl. No. 13/830,502, Final Office Action dated Jun. 30, 2015, 25 pages.
U.S. Appl. No. 13/830,502, Final Office Action dated Nov. 8, 2017, 27 pages.
U.S. Appl. No. 13/830,502, Final Office Action dated Jul. 6, 2016, 28 pages.
U.S. Appl. No. 13/830,502, Non-Final Office Action dated Nov. 20, 2014, 25 pages.
U.S. Appl. No. 13/830,502, Non-Final Office Action dated Dec. 11, 2015, 25 pages.
U.S. Appl. No. 13/830,502, Non-Final Office Action dated Apr. 7, 2017, 28 pages.
U.S. Appl. No. 13/830,502, Notice of Allowance dated Apr. 2, 2018, 8 pages.
U.S. Appl. No. 13/830,735, Final Office Action dated Sep. 29, 2017, 16 pages.
U.S. Appl. No. 13/830,735, Final Office Action dated Dec. 21, 2015, 20 pages.
U.S. Appl. No. 13/830,735, Non-Final Office Action dated Apr. 4, 2017, 16 pages.
U.S. Appl. No. 13/830,735, Non-Final Office Action dated May 26, 2015, 19 pages.
U.S. Appl. No. 13/830,735, Notice of Allowance dated Jan. 26, 2018, 9 pages.

(56) References Cited

OTHER PUBLICATIONS

U.S. Appl. No. 13/830,759, Final Office Action dated Feb. 18, 2016, 18 pages.
U.S. Appl. No. 13/830,759, Non-Final Office Action dated Aug. 7, 2015, 23 pages.
U.S. Appl. No. 13/830,759, Non-Final Office Action dated Feb. 10, 2017, 23 pages.
U.S. Appl. No. 13/830,759, Notice of Allowance dated Aug. 23, 2017, 14 pages.
U.S. Appl. No. 14/621,098, Final Office Action dated Apr. 21, 2016, 16 pages.
U.S. Appl. No. 14/621,098, Non-Final Office Action dated Nov. 14, 2016, 17 pages.
U.S. Appl. No. 14/621,098, Non-Final Office Action dated Oct. 15, 2015, 21 pages.
U.S. Appl. No. 14/621,098, Notice of Allowance dated May 3, 2017, 9 pages.
U.S. Appl. No. 14/973,377, Non-Final Office Action dated Nov. 30, 2017, 17 pages.
U.S. Appl. No. 14/973,377, Notice of Allowance dated May 2, 2018, 8 pages.
U.S. Appl. No. 15/003,646, Non-Final Office Action dated Dec. 2, 2016, 9 pages.
U.S. Appl. No. 15/003,646, Notice of Allowance dated May 19, 2017, 16 pages.
U.S. Appl. No. 15/015,933, Non-Final Office Action dated Jan. 30, 2017, 11 pages.
U.S. Appl. No. 15/015,933, Notice of Allowance dated May 17, 2017, 16 pages.
Abadi et al., Aurora: A New Model and Architecture for Data Stream Management, The VLDB Journal, The International Journal on Very Large Data Bases, vol. 12, No. 2, 2003, 20 pages.
Akama et al., Design and Evaluation of a Data Management System for WORM Data Processing, Journal of Information Processing, Information Processing Society of Japan, vol. 49, No. 2, Feb. 15, 2008, 18 pages.
Arasu, et al., An Abstract Semantics and Concrete Language for Continuous Queries over Streams and Relations, 9th International Workshop on Database programming languages, Nov. 2002, 12 pages.
Arasu, Continuous Queries Over Data Streams, Available online at https://pdfs.semanticscholar.org/483b/9af341766583d213b857a785396125fd4ea1.pdf, Feb. 2006, 15 pages.
Babu, et al., Continuous Queries over Data Streams, ACM SIGMOD Record, vol. 30, No. 3, Sep. 2001, 12 pages.
Babu et al., Exploiting k-Constraints to Reduce Memory Overhead in Continuous Queries Over Data Streams, ACM Transactions on Database Systems (TODS), vol. 29 Issue 3, Available Online at http://dl.acm.org/citation.cfmid=1016032, Sep. 2004, 36 pages.
Buza, Extension of CQL over Dynamic Databases, Journal of Universal Computer Science, vol. 12, No. 9, 2006, 12 pages.
Chandrasekaran et al., PSoup: A System for Streaming Queries Over Streaming Data, The VLDB Journal, The International Journal on Very Large Data Bases, vol. 12, No. 2, 2003, pp. 140-156.
Chen et al., NiagaraCQ: A Scalable Continuous Query System for Internet Databases, ACM SIGMOD Record, vol. 29, No. 2, May 14, 2000, pp. 379-390.
Chinese Application No. 201280022008.7, Office Action dated Dec. 3, 2015, 19 pages (9 pages of the original document and 10 pages of the English translation).
Chinese Application No. 201380056012.X, Office Action dated Jun. 1, 2017, 22 pages (10 pages of the original document and 12 pages of the English translation).
Chinese Application No. 201380056017.2, Office Action dated Jul. 17, 2017, 25 pages (16 pages of the original document and 9 pages of the English translation).
Chinese Application No. 201380056017.2, Office Action dated May 11, 2018, 8 pages (3 pages of the original document and 5 pages of the English translation).
Chinese Application No. 201380056099.0, Office Action dated Jul. 4, 2017, 26 pages (12 pages of the original document and 14 pages of the English translation).
Chinese Application No. 201380056099.0, Office Action dated Apr. 26, 2018, 8 pages (3 pages of the original document and 5 pages of the English translation).
European Application No. 12783063.6, Extended European Search Report dated Mar. 24, 2015, 6 pages.
European Application No. 12783063.6, Office Action dated Nov. 11, 2015, 8 pages.
European Application No. 13776641.6, Office Action dated Apr. 3, 2018, 5 pages.
European Application No. 13776642.4, Office Action dated May 3, 2018, 5 pages.
European Application No. 13776643.2, Office Action dated May 3, 2018, 4 pages.
Fantozzi, A Strategic Approach to Supply Chain Event Management, Master of Engineering in Logistics at the Massachusetts Institute of Technology, Jun. 2003, pp. 1-36.
Japanese Application No. 2014-509315, Office Action dated Mar. 15, 2016, 3 pages.
Japanese Application No. 2015-534676, Office Action dated Jan. 23, 2018, 10 pages (9 pages of the original document and 1 pages of the English translation).
Japanese Application No. 2015-534676, Office Action dated Jun. 27, 2017, 10 pages (9 pages of the original document and 1 pages of the English translation).
Japanese Application No. 2015-534678, Office Action dated Apr. 24, 2018, 4 pages (3 pages of the original document and 1 pages of the English translation).
Japanese Application No. 2015-534678, Office Action dated Aug. 29, 2017, 4 pages (3 pages of the original document and 1 pages of the English translation).
Japanese Application No. 2015-534680, Office Action dated Aug. 22, 2017, 10 pages.
Kitagawa et al., Sensing Network, Information Processing, Information Processing Society of Japan, vol. 51, No. 9, Sep. 15, 2010, pp. 1119-1126.
Kuwata et al., Stream Data Analysis Application for Customer Behavior with Complex Event Processing, IEICE Technical Report, The Institute of Electronics, Information and Communication Engineers, vol. 110, No. 107, Jun. 21, 2010, pp. 13-18.
International Application No. PCT/US2012/034970, International Preliminary Report on Patentability dated Nov. 21, 2013, 7 pages.
International Application No. PCT/US2012/034970, International Search Report and Written Opinion dated Jul. 16, 2012, 9 pages.
International Application No. PCT/US2013/062050, International Preliminary Report on Patentability dated Apr. 9, 2015, 9 pages.
International Application No. PCT/US2013/062050, International Search Report and Written Opinion dated Jul. 2, 2014, 13 pages.
Pradhan, Implementing and Configuring SAP® Event Management, Galileo Press, Boston, 2010, 21 pages.
Purich, Oracle Complex Event Processing, CQL Language Reference, 11g Release 1 (11.1.1.4.0), E12048-04, Jan. 2011, 228 pages.
Ray et al., Optimizing Complex Sequence Pattern Extraction Using Caching, Data Engineering Workshops (ICDEW), IEEE 27th International Conference on, IEEE, Apr. 11, 2011, pp. 243-248.
Tho, et al., Zero-Latency Data Warehousing for Heterogeneous Data Sources and Continuous Data Streams, 5th International Conference on Information Integration and Web-based Applications Services, Sep. 2003, 11 pages.
Traut et al., Oracle Fusion Middleware Cql Language Reference, 11g Release 1 (11.1.1.6.3), E12048-10, Aug. 2012, 226 pages.
Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Wilson, SAP Event Management, an Overview, Q Data USA, Inc., 2009, 16 pages.
Configuring Oracle CQL Processors, Available Online at https://docs.oracle.com/cd/E23943_01/dev.1111/e14301/processorcql.htm#CEPED705, Sep. 9, 2012, pp. 1-14.

(56) References Cited

OTHER PUBLICATIONS

Chinese Application No. 201380056017.2, Office Action dated Nov. 23, 2018, 3 pages.
European Application No. 13776642.4, Office Action dated Oct. 8, 2018, 7 pages.
European Application No. 14709807.3, Summons to Attend Oral Proceedings mailed on Oct. 1, 2018, 8 pages.
China Patent Application CN201380056017.2, Office Action dated Nov. 23, 2018, 3 pages.
China Patent Application CN201380056099.0, Office Action dated Dec. 5, 2018, 14 pages.
China Patent Application CN201380056099.0, Office Action dated Mar. 25, 2019, 18 pages.
China Patent Application CN201480009223.2, Office Action dated Nov. 23, 2018, 8 pages.
European Patent Application EP13776642.4, Office Action dated Oct. 8, 2018, 7 pages.
European Patent Application EP13776642.4, Summons to Attend Oral Proceedings mailed on Jul. 17, 2019, 9 pages.
Japan Patent Application JP2015-534676, Office Action dated Mar. 26, 2019, 8 pages.
Japan Patent Application JP2018-183302, Notice of Decision to Grant dated Sep. 17, 2019, 3 pages.
U.S. Appl. No. 15/968,536, Non-Final Office Action dated Feb. 4, 2020, 10 pages.
U.S. Appl. No. 15/968,536, Notice of Allowance dated Mar. 9, 2020, 8 pages.
U.S. Appl. No. 15/909,716, Non-Final Office Action dated Mar. 5, 2020, 21 pages.
Indian Application No. IN3873/CHENP/2015, First Examination Report dated Feb. 19, 2020, 7 pages.
U.S. Appl. No. 15/909,716, Final Office Action dated Aug. 13, 2020, 24 pages.
India patent Application IN1805/CHENP/2015, First Examination Report dated Jul. 28, 2020, 8 pages.

\* cited by examiner

PARAMETERIZED CONTINUOUS QUERY TEMPLATES

CROSS REFERENCES TO RELATED APPLICATIONS

The present application is a continuation of, and claims the benefit and priority of application Ser. No. 13/827,631 filed Mar. 14, 2013 entitled "PARAMETERIZED CONTINUOUS QUERY TEMPLATES", and also claims the benefit and priority under 35 U.S.C. 119(e) of U.S. Provisional Application No. 61/707,641 filed Sep. 28, 2012 entitled REAL-TIME BUSINESS EVENT ANALYSIS AND MONITORING. The entire contents of the above applications are incorporated herein by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Techniques for providing parameterized continuous query templates are described. According to at least one example, a computing system may receive a selection of one or more business logic templates. The selected business logic templates may indicate at least a type of template for generating a corresponding type of continuous query for the user. In some examples, the computing system may also receive, via the selected template, business event parameters associated with a user. The computing system may also generate based at least in part on the selections of the one or more business logic templates and the business event parameters associated with the user, a continuous query for retrieving business event data of the user. The type of the template may be an alert template type, a duplicate detection template type, an event count monitoring template type, a missing event detection template type, a trending detection template type, a top N item detection template type, and/or a moving aggregation template type. Further, in some examples, the alert template may include at least a key performance indicator alert template.

The computing system may also execute the generated continuous query to retrieve the business event data of the user. The computing system may also provide, via a user interface, display of the retrieved business event data of the user. Additionally, in some examples, the computing system may provide a user interface for selecting from among the one or more business logic templates prior to receiving the selection of the one or more business logic templates or the business event parameters. The continuous query may be configured to process streaming data or relation data (e.g., an archived relation). The relation data may include at least an unordered, time-varying set of tuples associated with the business event data of the user. The continuous query may be configured as a flat query or a group query. Further, the selection of the one or more business logic templates may include at least receiving a user-defined template.

According to at least one example, a computer-readable memory may store instructions that, when executed by one or more processors, may cause the one or more processors to receive selection of one of a plurality of continuous query types. Additionally, the instructions may also cause the one or more processors to provide, based at least in part on the received selection, a continuous query template corresponding to the selected continuous query type. Additionally, the instructions may also cause the one or more processors to receive, via the provided continuous query template, business event parameters. Further, the instructions may also cause the one or more processors to generate a continuous query based at least in part on the business event parameters and the continuous query template. In some examples, the instructions may also cause the one or more processors to provide a different respective interface for at least a subset of the plurality of continuous query types. The continuous query templates may include an alert template, a duplicate detection template, an event count monitoring template, a missing event detection template, a trending detection template, a top N item detection template, and/or a moving aggregation template. The continuous query may also be configured to enable retrieval of data from a stream or a relation.

According to at least one example, a computer-implemented method may include providing a user interface configured to enable selection from a plurality of business event query template types. The method may also include receiving selection of one of the plurality of business event query template types. Additionally, the method may include providing, based at least in part on the received selection, a query template corresponding to the selected business event query template type. The method may also include receiving, via the provided query template, business event parameters associated with user data. In some aspects, the method may also include generating a continuous query based at least in part on the received business event parameters and the query template and processing the user data based at least in part on the generated continuous query. In some aspects, processing the user data may include at least receiving the user data from a stream or based at least in part on a relation. Additionally, in some examples, the method may include providing the processed user data in a user interface configured for active display. The method may also include dynamically loading a workflow at least in response to the received selection, and wherein generating the continuous query includes at least implementing the workflow based at least in part on the business event parameters. Further, in some cases, the method may also include providing a natural language statement for identifying functionality of the continuous query.

The foregoing, together with other features and embodiments, will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

DETAILED DESCRIPTION

Figure 1:
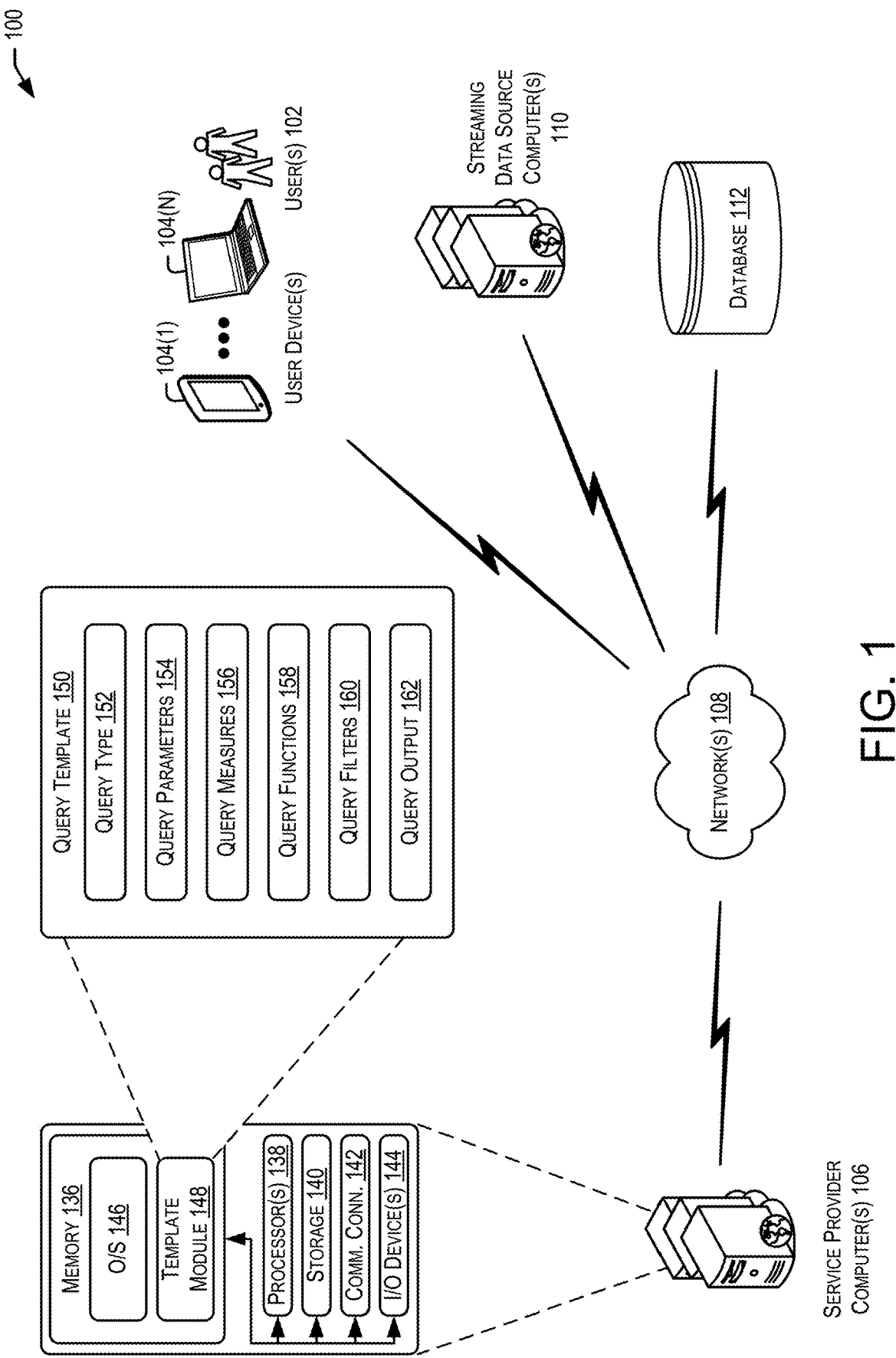
FIG. 1 is a simplified block diagram illustrating an example architecture for managing the parameterized continuous query templates, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing and/or providing parameterized continuous query templates. In some examples, parameterized UI templates may be utilized. The UI templates may include self-describing context for detection scenarios. The templates may work with both stream and relational sources. In some aspects, a business query may take a Data Object as input and create corresponding continuous query language (CQL) views and/or queries from it.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

In some examples, a continuous query may include a query configured to receive and/or process in-flight and/or real-time streaming data. Additionally, continuous queries may be utilized to analyze, monitor, and/or forecast complex business data that can help companies achieve "right time" decisions. With the continuous query abstraction, users can utilize the UI templates to create a continuous query without being requested to understand how to code. Under the cover, the generated CQL are registered to a continuous query service (hereinafter, "CQ Service." In some aspects, a CQ Service e is a facade for a CQL engine which is responsible for running the continuous queries.

A traditional ad-hoc query builder can be configured to act as a business query builder. A user can set most of the artifacts in a CQL query, such as project list, aggregation functions, group by fields, time window, etc. It may help the user to create a simple format CQL query but in most cases, it's still too difficult for the business users. Continuous query templates, on the other hand, can help a user to create a rather complex CQL query to perform one or more specific functions without knowing the detail CQL constructs. For example, a key performance (KPI) alert template can help a user to create CQL query for generating an alert event when a given moving KPI (temporal) measure is out of the constraints. Additionally, a missing events template may help a user to create a CQL query for detecting missing events with a specific pattern. Users may only need to make a few selections in the template to build a complex CQL statement. Additionally, an event engine may also take continuous query's output as an input for the alerting system. A continuous query may provide the query information as a modifier.xml for an event engine or service provider. Further, a trending detection template can help a user create a CQL to monitor the events trending up or down over a period of time instead of a single discrete point, and can also help to create an alert when a give measure trending is out of a specific range.

In some examples, there may be at least two different kinds of data sources for a CQL query including, but not limited to, a stream (e.g., archived) and a relation (e.g., archived). In some examples, a stream may be at least one principle source of data that CQL queries can act on. A stream S, may be a bag (i.e., a multi-set) of elements (s, T), where "s" is in the schema of S and T is in the time domain. In some aspects, stream elements may be tuple-time-stamp pairs, which can be represented as a sequence of time-stamped tuple insertions. In other words, a stream may be a sequence of time-stamped tuples. In some cases, there may be more than one tuple with the same time-stamp. The tuples of an input stream may be expected to arrive at the system in the order of increasing time-stamps. A relation may be time varying and may be defined as a mapping from the time domain to an unbounded multi-set (otherwise referred to as a "bag") of tuples to the schema of the relation. The relation may be an unordered, time-varying bag of tuples. As such, a relation may also be referred to as an instantaneous relation. In some examples, at every instant of time, a relation may be a bounded set. It may also be represented as a sequence of time-stamped tuples that can include insertions, deletions, and/or updates to capture the changing state of the relation. Like streams, relations may have a fixed schema to which all tuples within the relation conform.

In some examples, according to the functionality, a CQL query may take different types of data sources as input. For example, missing events and duplicate detection templates may request a stream type data source as input. Additionally, in some examples, a service provider may utilize data objects as data sources for both CQL queries and structured query language (SQL) queries. To support both streams and relations as inputs for CQL queries, the data object type may be specified and/or created. In general, a Stream Data Object may be a data source on which a user can do insert actions. And, in some examples, a Relation Data Object may be a data source on which a user can do insert, update, and delete actions. When a user creates the data object, its type may be specified by the user and/or automatically by the service provider. In some examples, the duplicate detection templates can only request a stream type data and missing events templates can use stream and relation type data.

Additionally, in some examples, operational intelligence (OI) may be a form of real-time dynamic, business analytics that can deliver visibility and insight into business operations. OI is often linked to or compared with BI or real-time BI, in the sense that both help make sense out of large amounts of information. But there are some basic differences: OI may be primarily activity-centric, whereas BI may be primarily data-centric. Additionally, OI may be more appropriate for detecting and responding to a developing situation (e.g., trend and pattern), unlike BI which may traditionally be used as an after-the-fact and report-based approach to identifying patterns. Finally, OI is usually uses a push approach and it is usually based on continuous queries for real time actions.

In some examples, a business event analysis and monitoring (BEAM) system may include a CQL engine to process and/or receive in-flight data. For example, a CQL engine may be an in-memory database engine configured to query or otherwise process incoming real-time information (e.g., BI or OI) in an incremental fashion. The CQL engine may utilize or understand temporal semantics and be configured to allow definition of a window of data (temporal) to process. Utilizing a CQL engine may, in some cases, involve always running a query on incoming data.

In some aspects, the CQL engine may include a full blown query language. As such, a user may specify computations in terms of a query. Additionally, the CQL engine may be designed for optimizing memory, utilizing query language features, operator sharing, rich pattern matching, rich language constructs, etc. Additionally, in some examples, the CQL engine may process both historical data and streaming data. For example, a user can set a query to send an alert when California sales hit above a certain target. Thus, in some examples, the alert may be based at least in part on historical sales data as well as incoming live (i.e., real-time) sales data over a period of moving time window.

In some examples, the CQL engine or other features of the below described concepts may be configured to combine a historical context (i.e., warehouse data) with incoming data in a real-time fashion. Thus, in some cases, the present disclosure may describe the boundary of database stored information and in-flight information. Both the database stored information and the inflight information may include BI data. As such, the database may, in some examples, be a BI server or it may be any type of database. Further, in some examples, the features of the present disclosure may enable the implementation of the above features without users knowing how to program or otherwise write code. In other words, the features may be provided in a feature-rich user interface (UI) or other manner that allows non-developers to implement business logic in the combination of historical data with real-time data.

Additionally, in some examples, the present disclosure may describe dashboard customization and/or personalization. A CEP engine may be configured to include advanced, continuous analysis of real-time information and historical data. Business process models (BPMs) may include performing model-driven execution of policies and processes defined as BPM notation (BPMN) models. Key result indicators (KRI) may be utilized to tell a user how they have done in a perspective or critical success factor (CSF). For example, it may provide results for many actions, it may cover a longer period of time than key performance indicators (KPIs), and/or it may be reviewed on monthly or quarterly periods. Result indicators (RIs) may be utilized to tell a user what they have done. For example, it may summarize activity, and financial performance measure and/or it may update daily, weekly, or monthly. Further, in some aspects, performance indicators (PIs) may be utilized to inform a user what actions to take or at least make recommendations. Additionally, it may include non-financial information and may, in some cases, complement the KPI.

In some aspects, PI may be reviewed 24/7, daily, weekly, or less regularly. In some cases, KPIs may include a set of measures that are most critical for the current and future success of an organization. Some KPIs may be updated daily or even 24/7 while the rest of the information may be reported weekly. Examples of KPI notifications may include, but are not limited to, whether a plane or other service vehicle was delayed or whether a trailer has been sent out underweight the previous day for a distribution company (e.g., to discover better utilization of the trucks).

In some examples, embodiments for managing real-time business events may include integrating (e.g., seamlessly) business activity monitoring, complex event processing, and business intelligence to provide a complex, and real-time set of operational information. Additionally, continuous monitoring of business events may be utilized to gain real-time visibility of business processes and/or workflows. In some examples, OI may be supplemented with traditional business intelligence. As such, operational intelligence may give more insight into business operations versus BI, which, as noted above, is more data centric. For example, OI may get inside to determine how a business is doing in a real-time fashion. Whereas BI may be more akin to data warehousing (e.g., indicating information after the fact).

Examples of KPI may include real-time call processing time. For example, a user may set real time KPI to be 15 minutes, versus weeks or days. As such, users may be enabled to take actions right away. Further, by coupling historical (data centric) information from BI warehouses with current real-time data, users may be able to view how a business is running in the current state (including continuously updated, streaming data). In some examples, advanced continuous analysis of real-time information may be included in the data processing. Additionally, incremental computations may be performed and included in displays, visualizations, user interfaces (UIs), etc.

FIG. 1 depicts a simplified example system or architecture 100 in which techniques for managing the parameterized continuous query templates described herein may be implemented. In architecture 100, one or more users 102 (e.g., account holders) may utilize user computing devices 104 (1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112. The databases 112 may be relational databases, SQL servers, or the like and may, in some examples, manage archived relations on behalf of the users 102. Additionally, the databases 112 may receive or otherwise store data provided by the streaming data source computers 110. In some examples, the users 102 may utilize the user devices 104 to interact with the service provider computers 106 by providing queries or query statements and/or by requesting the generation of queries (e.g., based at least in part on templates as described herein). Such queries or query statements (provided by the users 102 or generated on the users' 102 behalf) may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of the parameterized continuous query templates described herein. Additionally, in some aspects, the service provider computers 106 may be configured as part of an integrated, distributed computing environment that includes the streaming data source computers 110 and/or the databases 112 as noted above.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a template module 148. As used herein, modules may refer to programming modules executed by servers or clusters of servers that are part of a service. In this particular context, the modules may be executed by the servers or clusters of servers that are part of the service provider computers 106. In some examples, the template module 148 may be configured to generate or otherwise provide a user interface configured to enable selection, configuration, implementation, etc., of one or more query templates 150. For example, the template module 148 may provide the query templates 150 for display on the user devices 104. The users 102 may be able to select from one or more query types 152 via the UI noted above. Additionally, in some examples, the UI may enable the users 102 to select or enter one or more query parameters 154, query measures 156, query functions 158, query filters 160, and/or query outputs 162.

In some examples, query types 152 may include, but are not limited to, KPI alert template types, duplicate detection template types, event count monitoring template types, missing event detection template types, trending detection template types, top N item listing template types, and/or moving aggregation template types. In some aspects, query parameters 154 may include any parameters of a query including, but not limited to, current system time, stream start time, data object names, tuple identifiers, descriptions, methods identifiers, or other information useful for defining or otherwise identifying portions of a query statement or streaming/relation data. Additionally, in some examples, query measures 156 may include, but are not limited to, any type of parameter or other information associated with a business event that is being measured or is to be measured by the user 102. Query functions 158 may include, but are not limited to, functions to be performed by the query (e.g., moving average, median, total, etc.). Further, query filters 160 may include, but are not limited to, identifiers of filtering tools or other methods of sorting, organizing, or otherwise enabling easier viewing and/or analysis of the data. Query outputs 162 may include data retrieved and/or process by the query (e.g., data selected from a database, acknowledgement of data posted, updated, or deleted from a database, or the like).

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
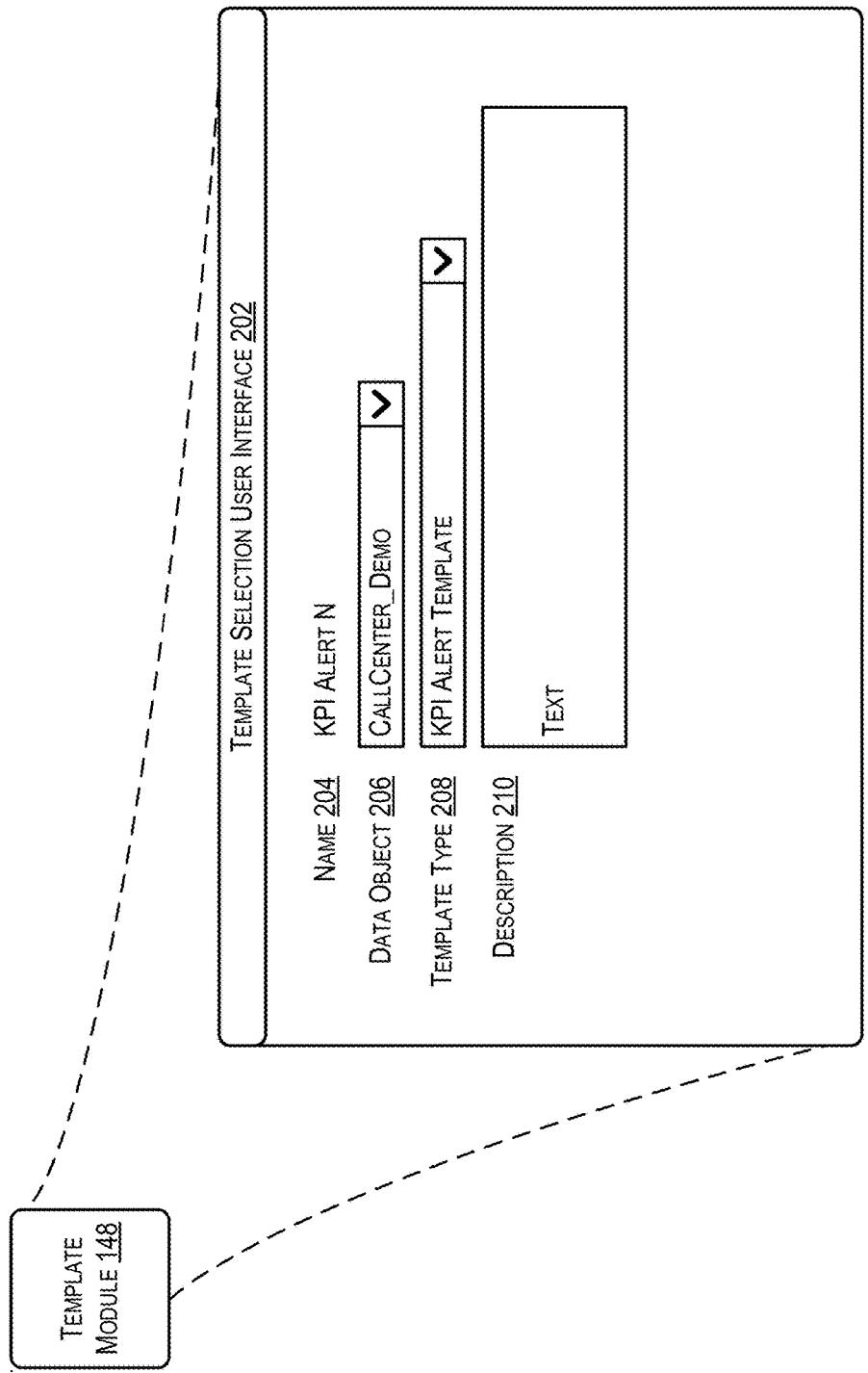
FIG. 2 is a simplified block diagram illustrating at least some features of the parameterized continuous query templates described herein, according to at least one example.

FIG. 2 depicts a simplified block diagram 200 with which features of the management of parameterized continuous query templates techniques may be described. In some examples, the template module 148 may be configured to provide a user interface for selecting from one or more templates or template types (e.g., the template selection UI 202). As used herein, a template type may indicate the type of a template. However, the template type may also be identified by the name of the template, which, in most cases will self-identify its type. For example, if a user selects the KPI template type, the UI 202 will provide a KPI template. In some examples, each template may have its own UI; however, in some examples, selection of the appropriate templates (i.e., the requested template) may be enabled via the template selection UI 202. Additionally, each individual template may be configured as taskflow (i.e., a workflow) which can be loaded dynamically when users 102 change the templates.

The template selection UI 202 may include several fields to aid in the selection of a template and/or preparation of the corresponding workflows. A name field 204 may be configured to display or otherwise indicate a name (e.g., entered by the user in this UI 202 or another UI) of the template being created. In this example, the name 204 has been selected, entered, or generated as "KPI Alert N" to indicate that a KPI alert template is being created. The name 204 may later be utilized to identify the query that is generated based at least in part on the query template. Additionally, in some examples, the template selection UI 202 may also include a data object selection area 206. The data object selection area 206 may include a drop-down box for displaying different data objects associated with the user 102 and/or a business process associated with the user 102. In this non-limiting example, the selected data object 206 may correspond to the "CallCenter_Demo" data object. Template types 208 may also be selected via a drop-down box of the template selection UI 202. As noted, the template types 208 may include KPI alert templates (as shown in FIG. 2) or any other template type that may correspond to a workflow for generating a continuous query. Further, the user 102 may be able to enter a description 210 of the template and/or of the continuous query to be generated by the template.

As noted above, many different types of templates may be provided. Some examples may include a KPI alert template. Utilizing such a query template, a user may define a KPI measure. In some examples, the measure may include an aggregation on a field. When the KPI measure falls out of the identified constraints, an alert may be provided to the user 102. The generated continuous query statements may be based at least in part on archived relations data objects (e.g., based at least in part on data from the streaming data source computers 110) and/or historical values (e.g., based at least in part on data from the database 112). Other examples of template types may include duplicate detection templates. The duplicate detection template may generate a continuous query configured to provide an alert if duplicate data is detected for a particular point in time. This template may work with archived relations and/or streams. However, in some examples, the duplicate detection template may only be used with archived streams.

An event count monitoring template type may include emitting an alert (e.g., on the hour) if there are less than a certain number of events within a period of time (e.g., every sixty minutes) for a particular account. Additionally, in some examples, a missing events detection template may detect and/or alert on missing events. For example, three different missing event patterns may be detected. The first pattern is called "bounded by events." This pattern implies a missing "approval." In this case, a missing "approval" may not need to be explicitly defined. The second pattern may describe "approval by exclusion" (i.e., events that are not "approvals"). This approach may work if "other" event types can occur between an "order" and a "shipment." The third patter is called, and may be, "bounded by time." The trend detection template may be configured to detect trends (e.g., prices that fluctuate by more than a specified percentage or the like). Additionally, in some examples, a top N item template may list the top N items for an aggregation value during a period (e.g., sixty minutes) with an output after a second period (e.g., ten minutes). Examples may include, but are not limited to, listing the top three sales for shopping centers. Further, a moving aggregate template may be configured to calculate a moving statistical aggregation on a field. For example, a moving average of processing time may be calculated for the last sixty minutes, and output every ten minutes, utilizing this template. Other user-defined templates may also be configured to generate continuous queries and/or provide alerts based at least in part on definitions and/or configurations implemented or created by one or more users 102.

In some examples, there are at least three definitions for KPI alerts. The first is "measure," which may define what a user 102 wants to monitor. In common, it may be an aggregation for a column, for example average of price, sum of sales. The second definition is "threshold." It may define in which conditions the alert may be sent. The third definition is the "payload" of the alert event. It may define what property or values will be sent out in the alert event.

Figure 3:
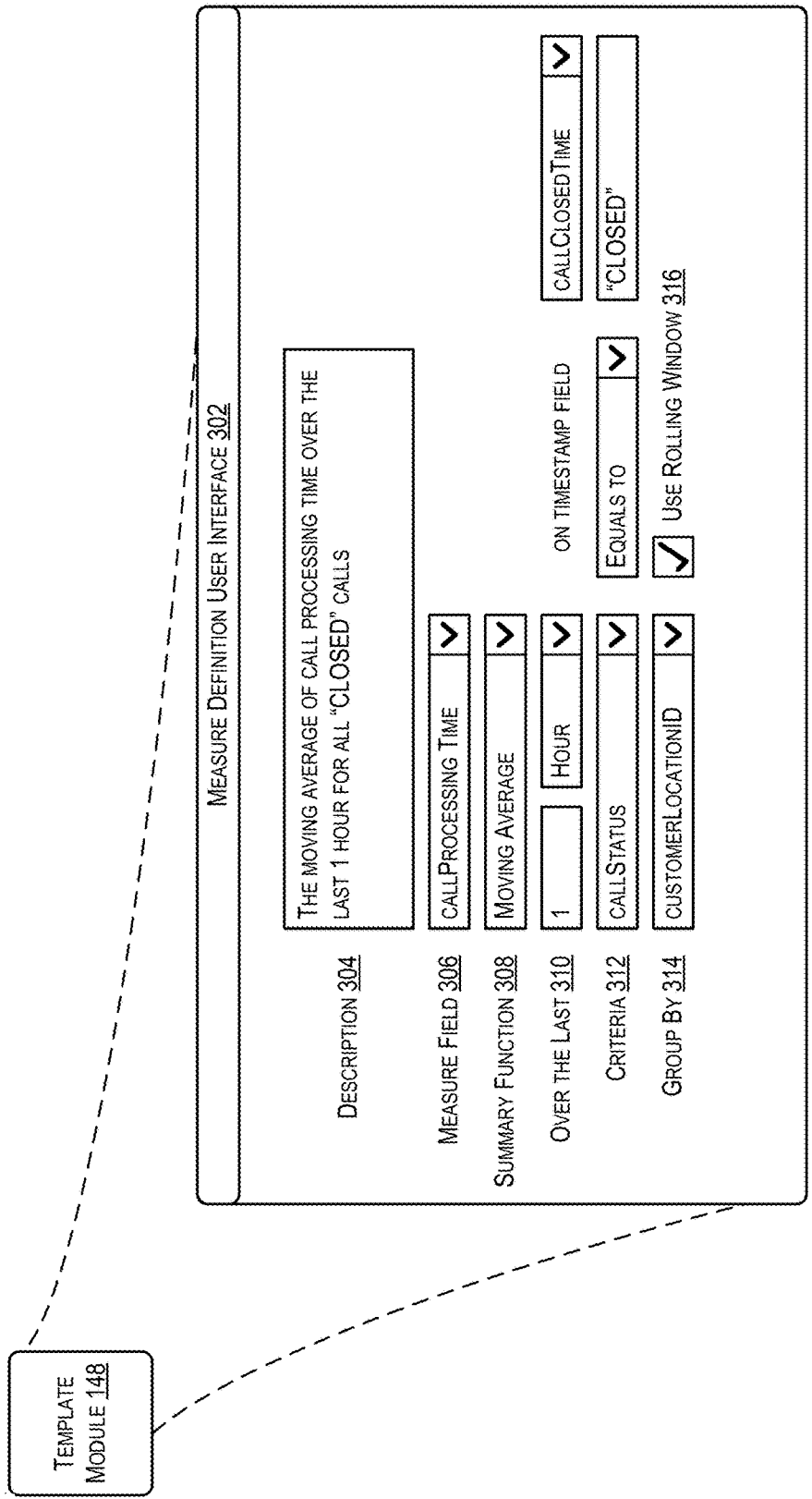
FIG. 3 is another simplified block diagram illustrating at least some additional features of the parameterized continuous query templates described herein, according to at least one example.

FIG. 3 depicts a simplified block diagram 300 for describing the measure definition UI 302 may be provided by the template module 148 of FIG. 1. In some examples, the measure definition UI 302 may be configured to enable parameterization of the template by the user 102. In some aspects, the user 102 may specify an aggregation on a column of a data object. The column may be a measure column. The aggregation may be calculated in a time window (e.g., one hour, twenty minutes, etc.). Also, the user 102 may set a couple of criteria conditions for the aggregation calculation. As seen, the measure definition UI 302 may enable adding a description 304, defining a measure 306, indicating a summary function 308, selecting a time window 310, selecting one or more criteria 312, selecting a group by type 314, and/or selecting whether to utilize a rolling window 316. Other features may also be selected associated with the rolling window selection 316, for example, a range length value and/or amount type (e.g., minutes, hours, etc.), an update interval value and/or amount type, and/or what the rolling window should be "based on" (e.g., call closed time, etc.).

Figure 4:
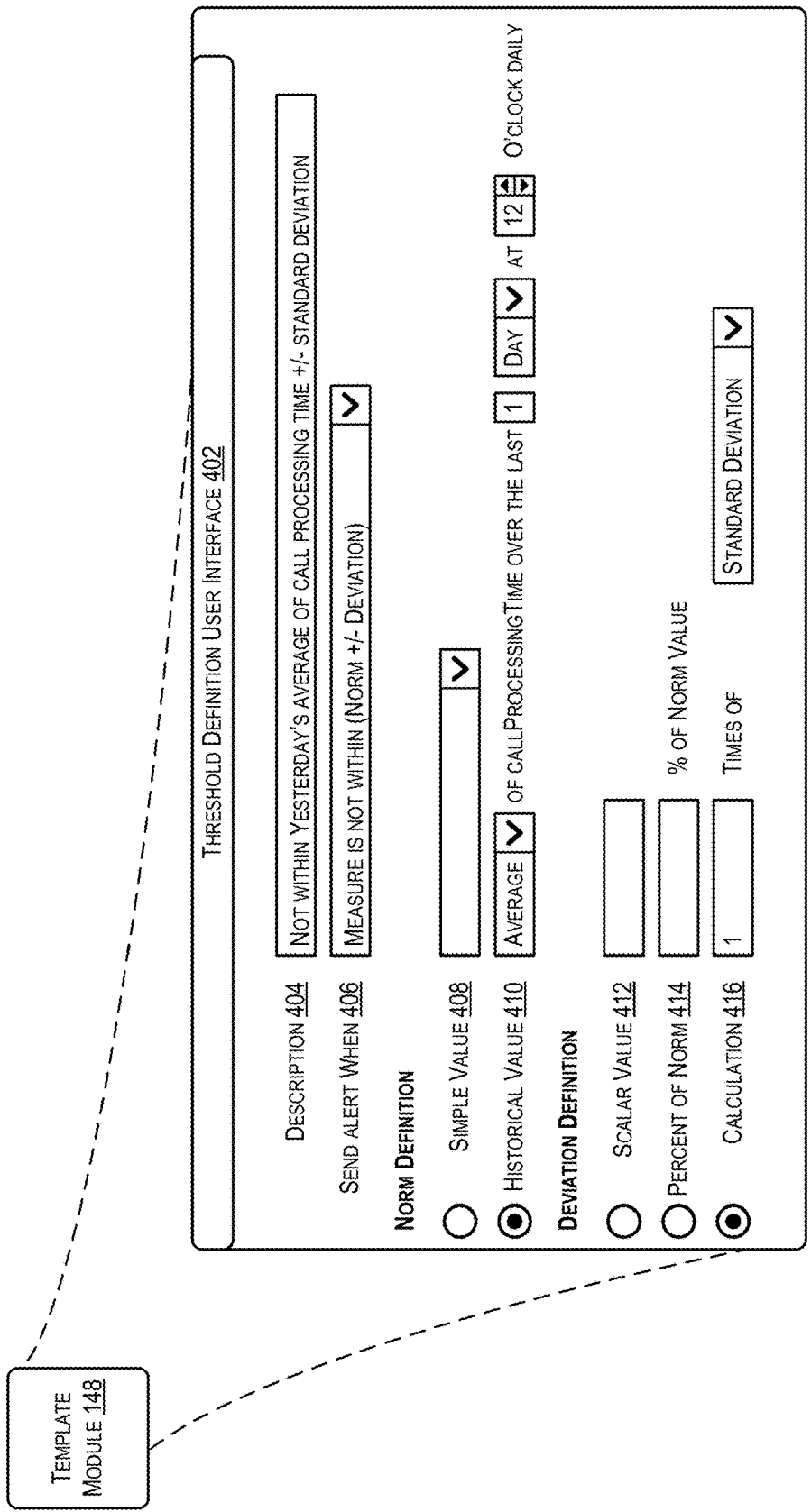
FIG. 4 is another simplified block diagram illustrating at least some additional features of the parameterized continuous query templates described herein, according to at least one example.

FIG. 4 depicts a simplified block diagram 400 for describing the threshold definition UI 402 may be provided by the template module 148 of FIG. 1. In some examples, the threshold definition UI 402 may be configured to enable parameterization of the template by the user 102. In some aspects, the user 102 may be enabled, via the UI 402, to enter a description 404 for the threshold and/or select between one or more threshold conditions 406 including, but not limited to, "measure is greater than Norm+Deviation," "measure is less than Norm−Deviation," and "measure is not within Norm+/−Deviation." In some examples, the Norm may be the normal value of the KPI measure. It could be a simple value 408, such as 10,000. It could also be calculated from historical values 410, for example average value of yesterday. To calculate the historical value 410, the user 102 may define the data set, for example all data of yesterday, all data from 2 o'clock to 3 o'clock. And, in some cases, the criteria would be the same as measure.

The Deviation may be the allowed deviation value for alerting. If the actual deviation of KPI measure is out of the allowed deviation, an alert event may be send. There may be three kinds of deviation. First, it could be a scalar value 412, for example 500. Second, it could be a fixed percent of the Norm value 414. Third, if the Norm value is calculated from historical value, it could be a calculated value 416 based at least in part on the same data set. For example, if the Norm value is yesterday's average, then the Deviation could be yesterday's standard deviation. Additionally, an alert event may include the output payload of an alert. In this case, it may include the norm value, the allowed deviation, the actual deviation, measure value, and/or any constants the user 102 defined, like the description 404. Further, A natural language statement may help users 102 to understand the query functionality better. The natural language statement may be a statement with hyperlinks. Those hyperlinks may refer the user 102 to the related properties editor. The user 102 can change the literal description of the hyperlinks, as desired.

Figure 5:
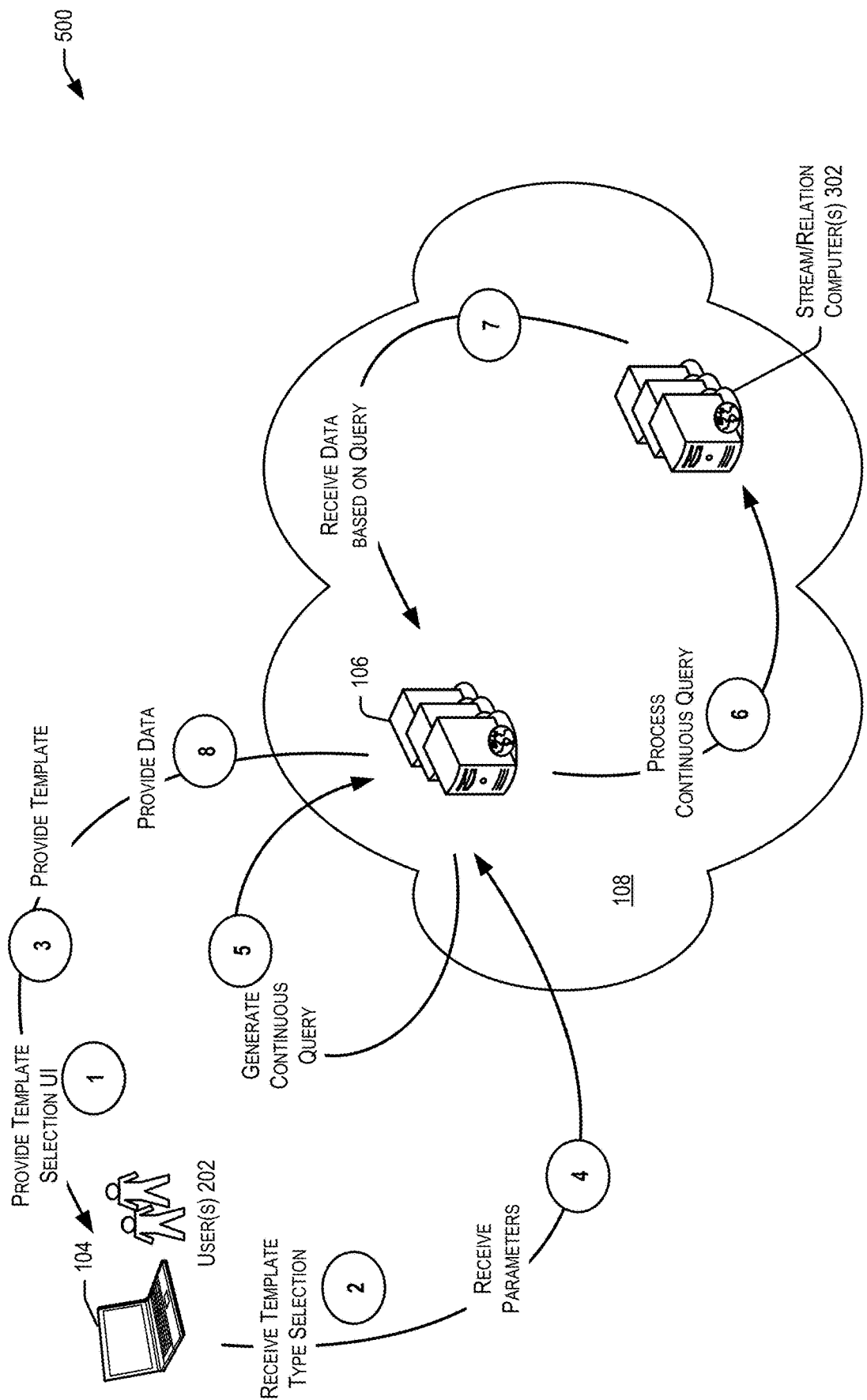
FIG. 5 is a simplified flow diagram illustrating at least some additional features of the parameterized continuous query templates described herein, according to at least one example.

FIG. 5 depicts a simplified flow diagram showing one or more techniques 500 for implementing the parameterized continuous query templates, according to one example. In FIG. 5, the service provider computers 106 are again shown in communication with the users 102 and/or user devices 104 via the networks 108. Additionally, in some examples, the service provider computers 106 may include or be in communication (e.g., via the networks 108) with one or more stream/relation computers 302 or stream/relation modules. While techniques 500 are shown in FIG. 5 in a particular order (including arbitrary sequence numbers), it should be understood that no particular order is necessary and that one or more steps or parts of the techniques 500 may be omitted, skipped, and/or reordered. In at least one non-limiting example, the one or more service provider computers 106 described above with reference to FIG. 1 may provide a template selection UI configured to enable the users 102 to select from a plurality of query templates. The service provider computers 106 may then receive, from the user devices 104, a template type selection indicating a particular template to be utilized for generating one or more continuous queries. As such, based at least in part on this select, the service provider computers 106 may then provide the corresponding template.

In some examples, the service provider computers 106 may then receive parameters, selections, etc., from the user devices 104 based at least in part on information provided through and/or selected from within the template. The service provider computes 106 may then generate a continuous query (e.g., utilizing a workflow) based at least in part on the workflow, the parameters provided by the user 102, and/or information of the template. Additionally, once the query is generated, the service provider computers 106 may be configured to process the continuous query on data of the stream/relation computers 302. The query may be performed based at least in part on a streaming data object and/or a relation. The service provider computers 106 may then receive data from the stream/relation computers 302 based at least in part on the continuous query performance, and provide the data to the user devices 104. In some aspects, providing the data may include generating a UI for visualization of active data (e.g., to simulate real-time changes within the stream and/or relation).

The service provider computers 106 may also issue query data definition languages (DDLs) to the CQ Service at runtime. As such, when a user 102 saves a continuous query, the service provider computers 106 may only need to generate Modifier.xml and store it into a metadata service (MDS). At runtime, if a user 102 opens a dashboard or starts an alerting which is based on the continuous query, a Report Cache may be able to read the continuous query configuration in MDS and get the Modifier.xml, with which it can generate the full CQL statement with security data filter predicates. In some aspects, each CQL statement may start with "execute physical" to indicate that it should be processed by the CQ Service. Additionally, in some cases, a user 102 may be able to start/stop continuous queries. The service provider computers 106 may be configured to provide these options on a UI (e.g., the UIs 202, 302, and/or 402). On the backend, the service provider computers 106 may be configured to issue DDLs to the CQ Service to start/stop a continuous query in progress. Further, some queries may be generated as flat queries and some may be generated as group queries. A flat query may not have any aggregation functions in the query, while a group query may include aggregations.

In some aspects, a user 102 may want to bind the output of a continuous query into a data object and do more further operation on it. In some cases, the service provider computers 102 may allow users 102 to do this. For example, when a user 102 finishes a query, and if he wants to bind the result into a data object, he has to define the mapping between project list and the outbound data object. On UI, there would be a tab for user to do the mapping.

Further, for alert systems, an event engine may be utilized. The event engine should know the output schema of the continuous query, at least the field name and type of the output payload, so that it can process the output event to raise an alert to the appropriate person. In one non-limiting example, the Event Engine may read the Modifier.xml to get the information of the query. Continuous query may then provide the similar xml for the Event Engine. Another reason for modifier is ReportCache, which may inject the CQL query into CQ Service at runtime. When a user 102 opens an active dashboard whereas real time data is being pushed to the dashboard, the ReportCache may add the row level security predicates into related CQL queries and inject it into CQ Service. So ReportCache may need a modifier to generate the CQL statement. The Modifier may have a type attribute to indicate whether it is a CQL modifier or a SQL modifier.

Figure 6:
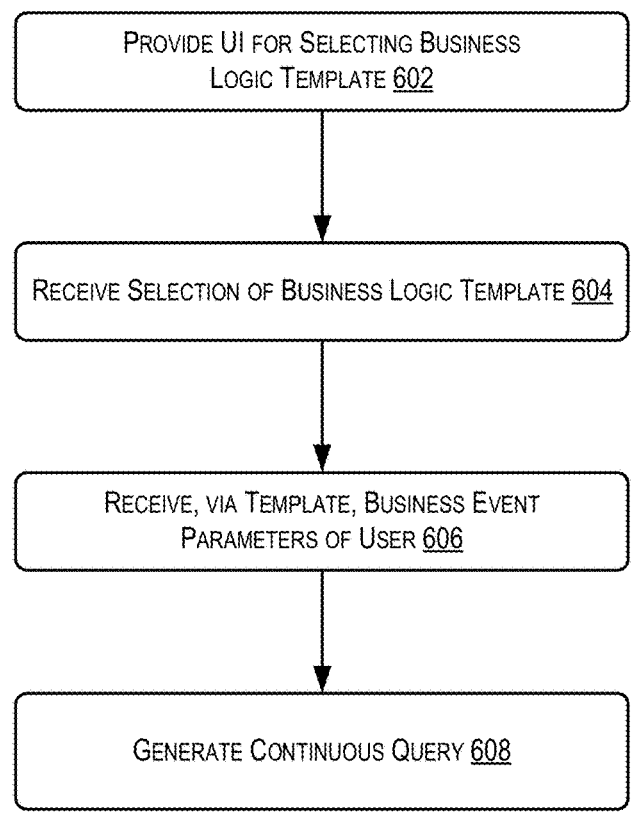
FIG. 6 is a simplified process flow illustrating at least some features of the parameterized continuous query templates described herein, according to at least one example.
Figure 7:
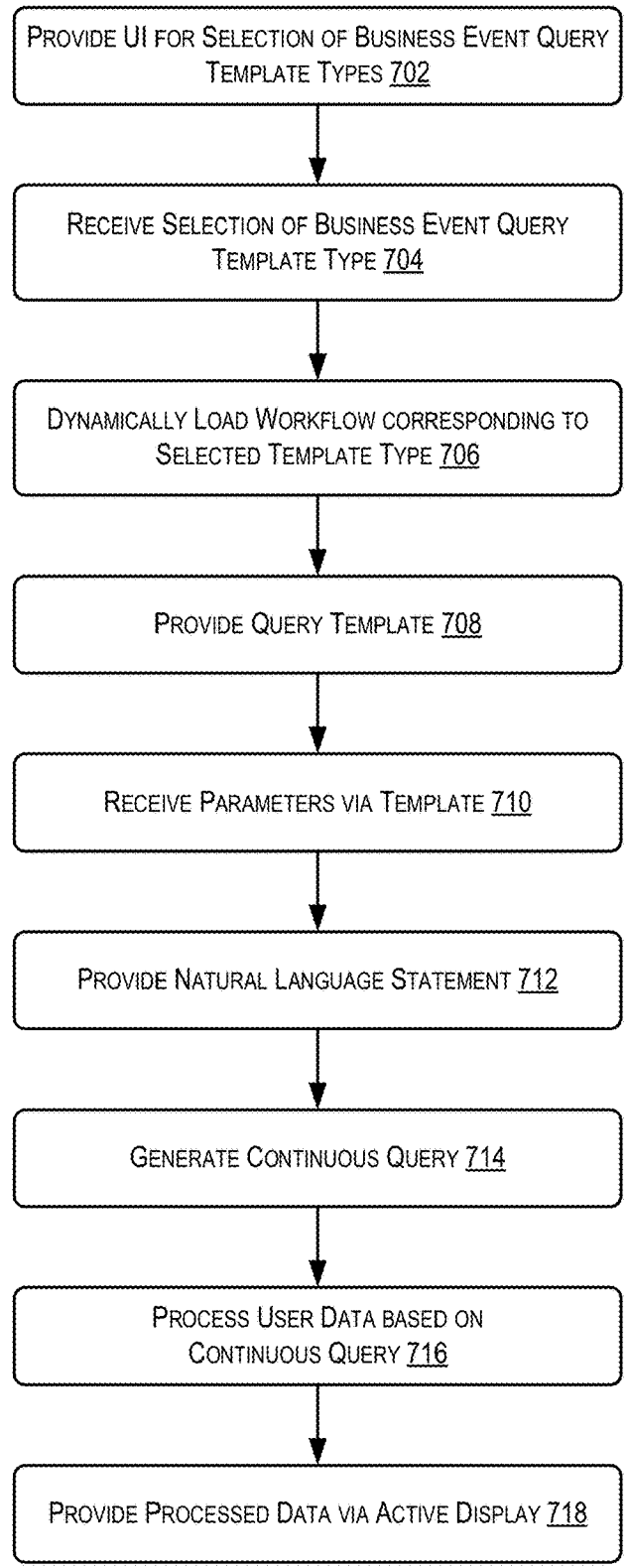
FIG. 7 is another simplified process flow illustrating at least some features of the parameterized continuous query templates described herein, according to at least one example.
Figure 8:
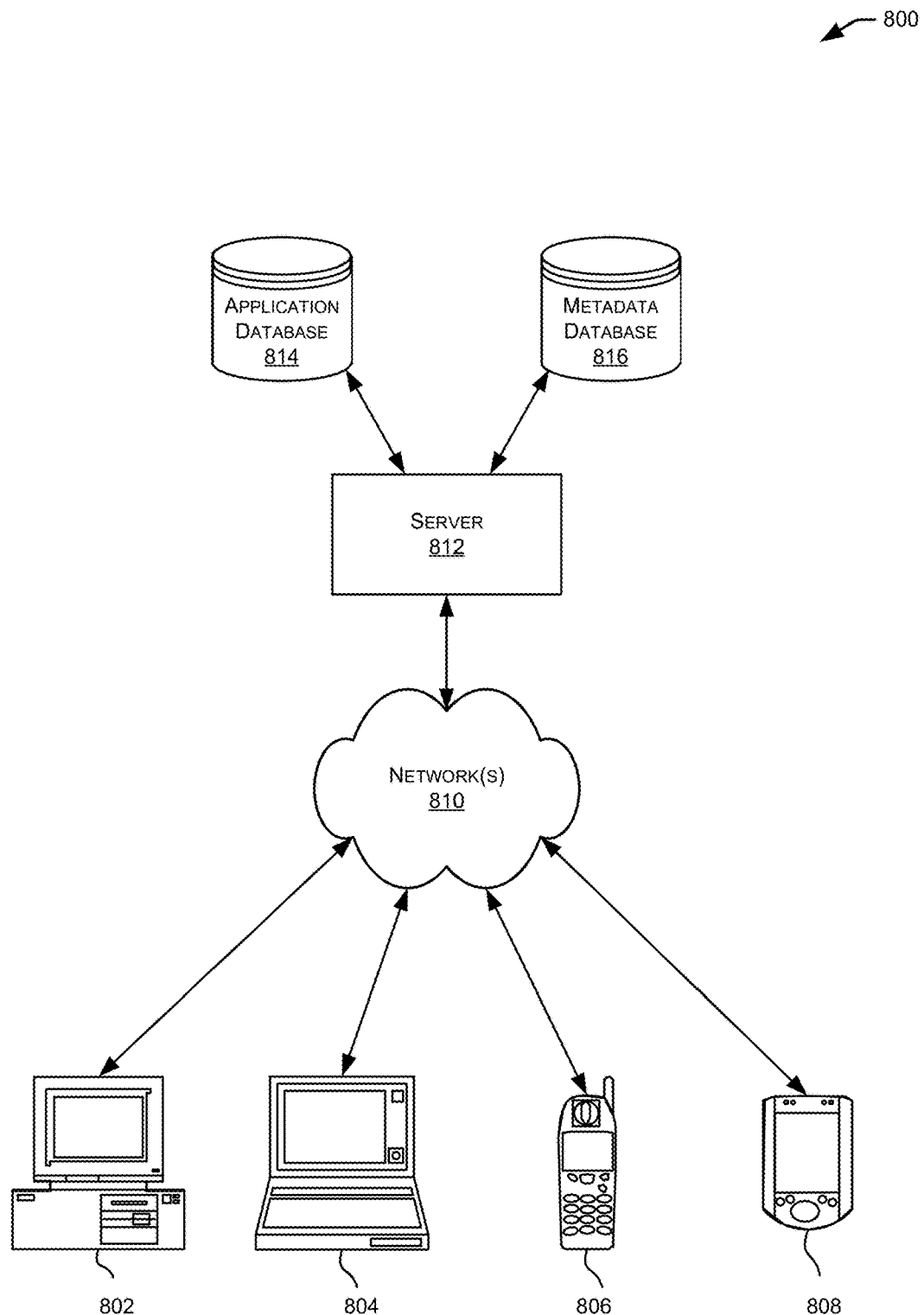
FIG. 8 is a simplified block diagram illustrating components of a system environment that may be used in accordance with an embodiment of the parameterized continuous query templates described herein, according to at least one example.

FIGS. 6-8 illustrate example flow diagrams showing respective processes 600, 700, and 800 for implementing the parameterized continuous query template techniques described herein. These processes 600, 700, 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the template module 148 of FIG. 1) shown in FIG. 1 may perform the process 600 of FIG. 6. The process 600 may begin by including providing a UI for selecting one or more business logic templates at 602. Business logic templates may include any template or template types described herein including, but not limited to, business event templates, or the like. At 604, the process 600 may include receiving selection of a business logic template for use with generating a continuous query. In some examples, the selection may be based at least in part on the user providing their selection at 602. At 606, the process 600 may include receiving, via a template, a business event parameter associated with the user and/or business events of the user. The process 600 may end at 608 by including generating a continuous query based at least in part on the type of template being used and/or the parameters entered into the template.

FIG. 7 illustrates an example flow diagram showing process 700 for implementing the parameterized continuous query template techniques described herein. The one or more service provider computers 106 (e.g., utilizing at least the template module 148 of FIG. 1) shown in FIG. 1 may perform the process 700 of FIG. 7. The process 700 may begin at 702 by including providing a UI for selection of business event query types. At 704, the process 700 may include receiving selection of one of the business event query template types. Additionally, the process 700 may also include dynamically loading a workflow corresponding to a selected template type at 706. At 708, the process 700 may include providing the query template to the user. As such, a template corresponding to the selected query type may be utilized by the user to generate or otherwise build a continuous query.

At 710, the process 700 may include receiving parameters via the template. At 712, the process 700 may include providing a natural language statement. The natural language statement may indicate the goal, plan, or functionality of the template being utilized. Additionally, in some examples, the process 700 may also include generating the continuous query based at least in part on the parameters, the selected template, and/or dynamically loaded workflow. At 716, the process 700 may include processing user data based at least in part on the continuous query. Further, at 718, the process 700 may end by including providing the processed data (e.g., retrieved and/or stored data) in an active display configured to show a user 102 one or more real-time changes in the user's business event data.

Illustrative methods and systems for implementing the fast path evaluation of Boolean predicates are described above. Some or all of these systems and methods may, but need not, be implemented at least partially by architectures and processes such as those shown at least in FIGS. 1-6 above.

FIG. 8 is a simplified block diagram illustrating components of a system environment 800 that may be used in accordance with an embodiment of the present disclosure. As shown, system environment 800 includes one or more client computing devices 802, 804, 806, 808, which are configured to operate a client application such as a web browser, proprietary client (e.g., Oracle Forms), or the like over one or more networks 810 (such as, but not limited to, networks similar to the networks 108 of FIGS. 1 and 3). In various embodiments, client computing devices 802, 804, 806, and 808 may interact with a server 812 over the networks 810.

Client computing devices 802, 804, 806, 808 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 802, 804, 806, and 808 may be any other electronic device, such as a thin-client computer, Internet-enabled gaming system, and/or personal messaging device, capable of communicating over a network (e.g., network 810 described below). Although exemplary system environment 800 is shown with four client computing devices, any number of client computing devices may be supported. Other devices such as devices with sensors, etc. may interact with server 812.

System environment 800 may include networks 810. Networks 810 may be any type of network familiar to those skilled in the art that can support data communications using any of a variety of commercially-available protocols, including without limitation TCP/IP, SNA, IPX, AppleTalk, and the like. Merely by way of example, network 810 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 800 also includes one or more server computers 812 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 800 may also include one or more databases 814, 816. Databases 814, 816 may reside in a variety of locations. By way of example, one or more of databases 814, 816 may reside on a non-transitory storage medium local to (and/or resident in) server 812. Alternatively, databases 814, 816 may be remote from server 812, and in communication with server 812 via a network-based or dedicated connection. In one set of embodiments, databases 814, 816 may reside in a storage-area network (SAN) familiar to those skilled in the art. Similarly, any necessary files for performing the functions attributed to server 812 may be stored locally on server 812 and/or remotely, as appropriate. In one set of embodiments, databases 814, 816 may include relational databases, such as databases provided by Oracle, that are adapted to store, update, and retrieve data in response to SQL-formatted commands.

Figure 9:
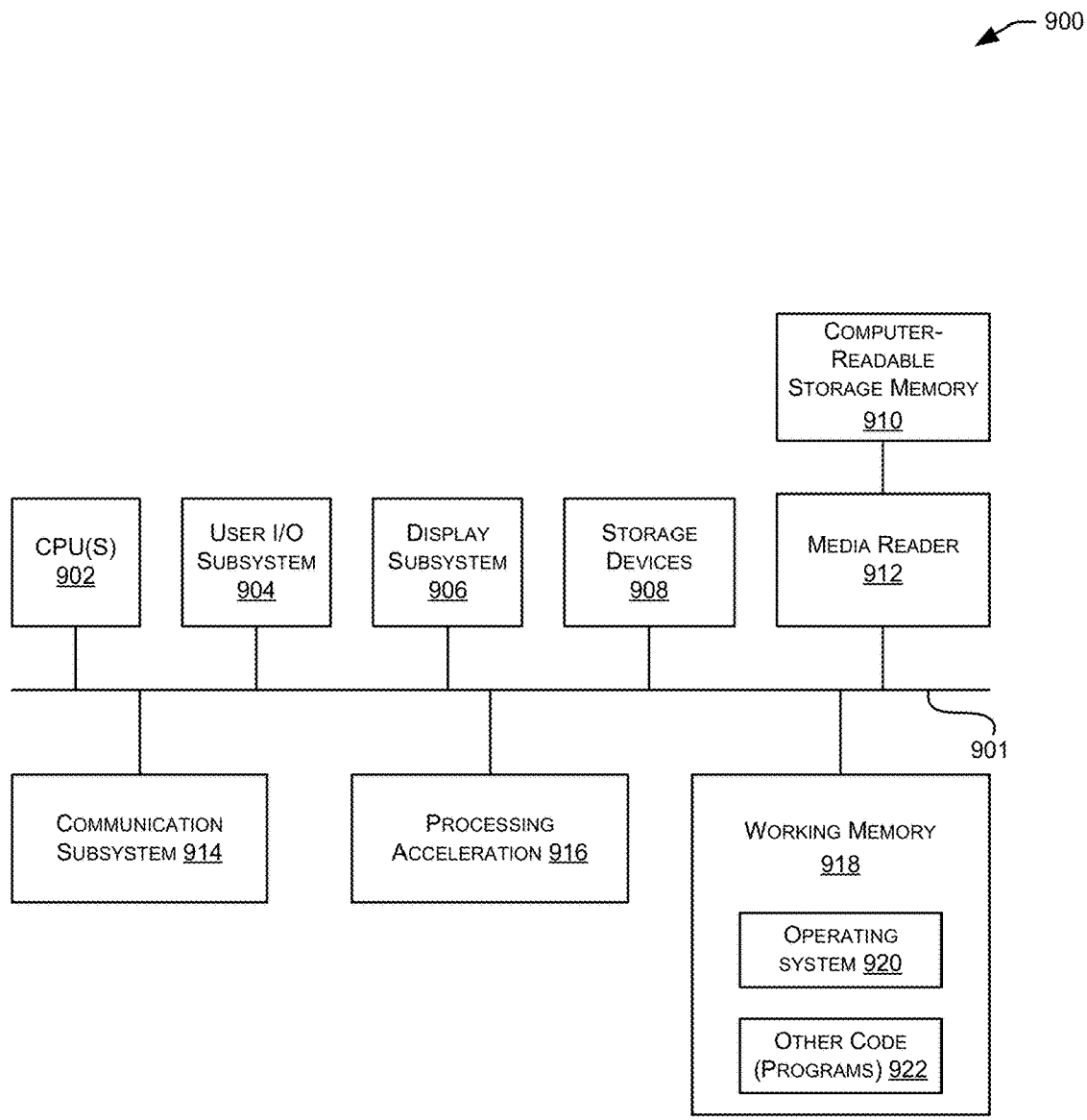
FIG. 9 is a simplified block diagram illustrating a computer system that may be used in accordance with embodiments of the parameterized continuous query templates described herein, according to at least one example.

FIG. 9 is a simplified block diagram of a computer system 900 that may be used in accordance with embodiments of the present disclosure. For example service provider computers 106 may be implemented using a system such as system 900. Computer system 900 is shown comprising hardware elements that may be electrically and/or communicatively coupled via a bus 901. The hardware elements may include one or more central processing units (CPUs) 902, one or more input devices 904 (e.g., a mouse, a keyboard, etc.), and one or more output devices 906 (e.g., a display device, a printer, etc.). Computer system 900 may also include one or more storage devices 908. By way of example, the storage device(s) 908 may include devices such as disk drives, optical storage devices, and solid-state storage devices such as a random access memory (RAM) and/or a read-only memory (ROM), which can be programmable, flash-updateable and/or the like.

Computer system 900 may additionally include a computer-readable storage media reader 912, a communications subsystem 914 (e.g., a modem, a network card (wireless or wired), an infra-red communication device, etc.), and working memory 918, which may include RAM and ROM devices as described above. In some embodiments, computer system 900 may also include a processing acceleration unit 916, which can include a digital signal processor (DSP), a special-purpose processor, and/or the like.

Computer-readable storage media reader 912 can further be connected to a computer-readable storage medium 910, together (and, optionally, in combination with storage device(s) 908) comprehensively representing remote, local, fixed, and/or removable storage devices plus storage media for temporarily and/or more permanently containing computer-readable information. Communications system 914 may permit data to be exchanged with network 912 and/or any other computer described above with respect to system environment 900.

Computer system 900 may also comprise software elements, shown as being currently located within working memory 918, including an operating system 920 and/or other code 922, such as an application program (which may be a client application, Web browser, mid-tier application, RDBMS, etc.). In an exemplary embodiment, working memory 918 may include executable code and associated data structures used for relying party and open authorization-related processing as described above. It should be appreciated that alternative embodiments of computer system 900 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to, volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-7 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
a memory storing a plurality of instructions; and
one or more processors configured to access the memory, wherein the one or more processors are further configured to execute the plurality of instructions to at least:
present, via a first user interface, a set of one or more business logic template types for generating one or more corresponding types of continuous query language (CQL) queries for a user;
receive, via the first user interface, a selection of a business logic template type from the set of one or more business logic template types for generating a corresponding type of CQL query for a user;
generate a business logic template corresponding to the selected business logic template type by:
identifying a set of configuration parameters corresponding to the selected business logic template type;
presenting, via a second user interface, the set of one or more configuration parameters corresponding to the selected business logic template type, the set of one or more configuration parameters comprising at least a CQL query parameter and a threshold condition associated with the CQL query parameter;
identifying, via the second user interface, a selection of the CQL query parameter related to the selected business logic template type, the CQL query parameter comprising a Key Performance Indicator (KPI) measure that measures a critical metric of an organization, and the KPI measure specifying an aggregation on a column of a data object such that execution of the CQL query aggregates the column to compare against a threshold condition;
identifying, via the second user interface, a selection of the threshold condition for the KPI measure that identifies a critical threshold corresponding to the critical metric;
based at least in part on the selected threshold condition, determining an alert event to be transmitted to the user when a value associated with the KPI measure exceeds the critical threshold, the alert event comprising at least an output payload specifying a property relating to the critical metric of the organization; and
generating the business logic template based at least in part on the selected CQL query parameter, the selected threshold condition and the alert event corresponding to the selected business logic template type;
upon the generation of the business logic template, determine, from a set of input data source types, one or more compatible input data source types usable with the business logic template, the set of input data source types including a stream type data and a relation type data;
receive a user-selected input data source type of the one or more compatible input data source types and a user-selected value for the critical threshold;
generate the CQL query for retrieving business event data of the user based at least in part on the business logic template, the CQL query parameter related to the business logic template, the user-selected input data source type, and the user-selected value for the critical threshold, the CQL query configured to provide the alert event when the value associated with the KPI measure exceeds the critical threshold, and the generation of the CQL query comprising implementing a workflow based at least in part on business event parameters; and
execute the CQL query on an input data source of the user-selected input data source type to retrieve the business event data associated with the user.

2. The system of claim 1, wherein the determining, from a set of input data source types, one or more compatible input data source types usable with the business logic template includes determining actions associated with the business logic template.

3. The system of claim 1, wherein the one or more processors are further configured to execute the plurality of instructions to at least provide, via a user interface, display of the retrieved business event data associated with the user.

4. The system of claim 1, wherein the business logic template comprises a Key Performance Indicator (KPI) alert template.

5. The system of claim 1, wherein the business logic template type comprises at least one of a duplicate detection template type, an event count monitoring template type, a missing event detection template type, a trending detection template type, a top N item detection template type, or a moving aggregation template type.

6. The system of claim 1, wherein the one or more processors are further configured to execute the plurality of instructions to at least:
generate an extensible markup language (XML) file configured to enable subsequent generation of the generated CQL query.

7. The system of claim 1, wherein the one or more processors are further configured to execute the plurality of instructions to at least provide the first user interface for selecting the business logic template type from among the set of one or more business logic template types.

8. The system of claim 1, wherein the one or more processors are further configured to execute the plurality of instructions to at least:
receive a request to open an active dashboard for presenting the business event data of the user.

9. The system of claim 1, wherein the input data source is an archived relation data object containing an unordered, time-varying set of tuples associated with the business event data associated with the user.

10. The system of claim 1, wherein the CQL query is configured as a flat query or a group query.

11. The system of claim 1, wherein receiving the selection of the business logic template type includes at least receiving a user-defined template.

12. A non-transitory computer-readable memory storing a plurality of instructions executable by one or more processors, the plurality of instructions comprising:
instructions that cause the one or more processors to present, via a first user interface, a set of one or more business logic template types for generating one or more corresponding types of continuous query language (CQL) queries for a user;
instructions that cause the one or more processors to receive, via the first user interface, a selection of a business logic template type from the set of one or more business logic template types for generating a corresponding type of CQL query for a user;

instructions that cause the one or more processors to generate a business logic template corresponding to the selected business logic template type by:
  identifying a set of configuration parameters corresponding to the selected business logic template type;
  presenting, via second user interface, the set of one or more configuration parameters corresponding to the selected business logic template type, the set of one or more configuration parameters comprising at least a CQL query parameter and a threshold condition associated with the CQL query parameter;
  identifying, via the second user interface, a selection of the CQL query parameter related to the selected business logic template type, the CQL query parameter comprising a Key Performance Indicator (KPI) measure that measures a critical metric of an organization, and the KPI measure specifying an aggregation on a column of a data object such that execution of the CQL query aggregates the column to compare against a threshold condition;
  identifying, via the second user interface, a selection of the threshold condition for the KPI measure that identifies a critical threshold corresponding to the critical metric;
  based at least in part on the selected threshold condition, determining an alert event to be transmitted to the user when a value associated with the KPI measure exceeds the critical threshold, the alert event comprising at least an output payload specifying a property relating to the critical metric of the organization; and
  generating the business logic template based at least in part on the selected CQL query parameter, the selected threshold condition and the alert event corresponding to the business logic template type;
instructions that cause the one or more processors to, upon the generation of the business logic template, determine, from a set of input data source types, one or more compatible input data source types usable with the business logic template, the set of input data source types including a stream type data and a relation type data;
instructions that cause the one or more processors to receive a user-selected input data source type of the one or more compatible input data source types and a user-selected value for the critical threshold;
instructions that cause the one or more processors to generate the CQL query for retrieving business event data of the user based at least in part on the business logic template, the CQL query parameter related to the business logic template, the user-selected input data source type, and the user-selected value for the critical threshold, the CQL query configured to provide the alert event when the value associated with the KPI measure exceeds the critical threshold, and the generation of the CQL query comprising implementing a workflow based at least in part on business event parameters; and
instructions that cause the one or more processors to execute the CQL query on an input data source of the user-selected input data source type to retrieve the business event data associated with the user.

13. The non-transitory computer-readable memory of claim 12, wherein the selected business logic template type comprises at least one of an alert template type, a duplicate detection template type, an event count monitoring template type, a missing event detection template type, a trending detection template type, a top N item detection template type, or a moving aggregation template type.

14. A computer-implemented method, comprising:
  presenting, via a first user interface, a set of one or more business logic template types for generating one or more corresponding types of continuous query language (CQL) queries for a user;
  receiving, via the first user interface, a selection of a business logic template type from the set of one or more business logic template types for generating a corresponding type of CQL query for a user;
  generating a business logic template corresponding to the selected business logic template type by:
    identifying a set of configuration parameters corresponding to the selected business logic template type;
    presenting, via second user interface, the set of one or more configuration parameters corresponding to the selected business logic template type, the set of one or more configuration parameters comprising at least a CQL query parameter and a threshold condition associated with the CQL query parameter;
    identifying, via the second user interface, a selection of the CQL query parameter related to the selected business logic template type, the CQL query parameter comprising a Key Performance Indicator (KPI) measure that measures a critical metric of an organization, and the KPI measure specifying an aggregation on a column of a data object such that execution of the CQL query aggregates the column to compare against a threshold condition;
    identifying, via the second user interface, a selection of the threshold condition for the KPI measure that identifies a critical threshold corresponding to the critical metric;
    based at least in part on the selected threshold condition, determining an alert event to be transmitted to the user when a value associated with the KPI measure exceeds the critical threshold, the alert event comprising at least an output payload specifying a property relating to the critical metric of the organization; and
    generating the business logic template based at least in part on the selected CQL query parameter, the selected threshold condition and the alert event corresponding to the selected business logic template type;
  upon the generation of the business logic template, determining, from a set of input data source types, one or more compatible input data source types usable with the business logic template, the set of input data source types including a stream type data and a relation type data;
  receiving a user-selected input data source type of the one or more compatible input data source types and a user-selected value for the critical threshold;
  generating the CQL query for retrieving business event data of the user based at least in part on the business logic template, the CQL query parameter related to the business logic template, the user-selected input data source type, and the user-selected value for the critical threshold, the CQL query configured to provide the alert event when the value associated with the KPI measure exceeds the critical threshold, and the generation of the CQL query comprising implementing a workflow based at least in part on business event parameters; and executing the CQL query on an input data source of the user-selected input data source type to retrieve the business event data associated with the user.

15. The computer-implemented method of claim 14, further comprising processing the user data based at least in part on the generated CQL query, wherein processing the user data includes at least receiving the user data from a stream or based at least in part on a relation.

16. The computer-implemented method of claim 14, wherein the selected business logic template type indicates a type of template comprising at least one of a duplicate detection template type, an event count monitoring template type, a missing event detection template type, a trending detection template type, a top N item detection template type, or a moving aggregation template type.

17. The system of claim 1, wherein the workflow is dynamically loaded from among a plurality of task flows associated with the one or more business logic template types and in response to the received selection of the business logic template type.

18. The system of claim 5, wherein:

the selected business logic template type indicates the type of template comprising the duplicate detection template type; and the CQL query is configured to provide the alert event if duplicate data is detected.

19. The system of claim 1, wherein the output payload specifies a norm value associated with the KPI measure, an allowed deviation associated with the threshold condition, and/or an actual deviation associated with the KPI measure.

* * * * *

UNITED STATES PATENT AND TRADEMARK OFFICE
CERTIFICATE OF CORRECTION

Page 1 of 1

PATENT NO. : 10,891,293 B2
APPLICATION NO. : 16/014748
DATED : January 12, 2021
INVENTOR(S) : Hsiao et al.

It is certified that error appears in the above-identified patent and that said Letters Patent is hereby corrected as shown below:

In the Specification

In Column 5, Line 41, delete "Service e" and insert -- Service --, therefor.

In the Claims

In Column 20, Line 24, in Claim 5, after "wherein the" insert -- selected --.

In Column 21, Line 36, in Claim 12, after "the" insert -- selected --.

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*